ITSUKI BAN
INVENTOR

BY Wenderoth, Lind & Ponack
ATTORNEYS

May 19, 1970  ITSUKI BAN  3,512,785
AUTOMATIC PLAYING APPARATUS UTILIZING PLURALITY
OF ENDLESS TAPE CARTRIDGES
Filed Feb. 9, 1968  10 Sheets-Sheet 2

ITSUKI BAN
INVENTOR

BY Wenderoth, Lind &
Ponack
ATTORNEYS

May 19, 1970  ITSUKI BAN  3,512,785
AUTOMATIC PLAYING APPARATUS UTILIZING PLURALITY
OF ENDLESS TAPE CARTRIDGES
Filed Feb. 9, 1968  10 Sheets-Sheet 3

ITSUKI BAN
INVENTOR
BY *Wenderoth, Lind &*
*Ponack*
ATTORNEYS

ITSUKI BAN
INVENTOR

United States Patent Office 3,512,785
Patented May 19, 1970

3,512,785
AUTOMATIC PLAYING APPARATUS UTILIZING PLURALITY OF ENDLESS TAPE CARTRIDGES
Itsuki Ban, 829 Higashi-Oizumi-machi, Nerima-ku, Tokyo, Japan
Filed Feb. 9, 1968, Ser. No. 704,985
Claims priority, application Japan, Feb. 17, 1967, 42/9,867, 42/9,868; Mar. 2, 1967, 42/12,841
Int. Cl. G11b 5/00
U.S. Cl. 274—4                                15 Claims

ABSTRACT OF THE DISCLOSURE

An apparatus for automaticaly playing a plurality of endless tape cartridges in succession according to a specific sequential program. A cylindrical or rectilinear casing for holding a line of a plurality of cartridges for slidable movement transversely of the casing is mounted on mounting means for movement in the direction of the line of cartridges for moving the cartridges in succession past a reproducing station. Means is provided cooperating with an abutment at said reproducing station for stopping movement of said casing. A cartridge moving lever at said reproducing station is reciprocally movable in the direction of the sliding movement of said cartridges and engagable with successive cartridges at said reproducing station for moving the cartridge from the casing into a play position and back into the casing. A lever moving means is coupled to said lever for moving said lever in one direction at the time when the casing brings the cartridge into position opposite the reproducing station and moving it in the other direction when the play of the tape is ended. A drive connecting means couples said lever moving means with the drive of the tape recorder and reproducer for actuating the lever moving means to move the cartridge being played into the casing and after the casing has moved moving the next cartridge in succession into the reproducing station and then disconnecting the lever moving means from the drive. A sensing device is provided for scanning the tape for sensing completion of play of the tape, said sensing device being coupled to said drive connecting means for actuating it when play of the tape has ended.

Background of the invention

It is known to apply the concept of automatically playing disc-shaped records in a juke box to the use of a plurality of endless tape cartridges with a recording-reproducing apparatus. Such prior art concept has been utilized to provide means for taking a tape cartridge out of a stack of tape cartridges for recording and reproducing. A problem associated with concept is the lack of practicality due to the fact that the dimensions are too large and the cost is too high to provide such an apparatus for individual use.

The present invention contemplates the provision of an automatic playing apparatus which, when used in conjunction with means rotating and moving a cartridge receiving casing, does not require waste of electric power and is compact and can be made at low cost.

Summary of the invention

This invention relates to an automatic playing apparatus for playing a plurality of endless tape cartridges and playing in succession the tape contained in each cartridge as programmed.

It is a principal object of the invention, accordingly, to provide an automatic playing apparatus having a cartridge receiving casing which is capable of accomodating currently available tape cartridges without the necessity of modification thereof and a reciprocating lever for operating the cartridge.

A further object of the invention is to provide an automatic playing apparatus in which the casing is compact so that it does not occupy a great deal of space while it is capable of receiving radially or rectilinearly a multiplicity of the cartridges and is adapted to be rotated or moved when the tape contained in the cartridges is to be played.

Another object of the invention is to provide an automatic playing apparatus in which a push button link is mounted in a position corresponding to each cartridge to arrest rotation or movement of the casing to bring the cartridge into the play position when the link is into engagement with a raised portion mounted on the cabinet of the apparatus.

Still another object of the invention is to provide an automatic playing apparatus wherein reciprocating lever means is operated by a cam rotated by the output of a motor to reciprocate the cartridge to be played, an association of the cam with the motor being established by a switch which is actuated by rotation of the cam and by energization of an electromagnetic means which is actuated and deactuated by a signal of an end mark on the tape, whereby the cartridge is reciprocated from the standby to the play position.

A still further object of the invention is to provide an automatic playing apparatus wherein the position of the cartridge and a capstan thereof relative to that of a head is positioned to improve the tone quality when the tape is played.

For a fuller understanding of the features and objects of the invention, reference should be had to the following detailed description of preferred embodiments taken in conjunction with the accompanying drawings, in which:

FIG. 23 is a perspective view of a modified form of a track transferring mechanism;

FIG. 25 is a schematic view of a principal part of a cartridge operating mechanism for the casing shown in FIG. 24a;

The structure of the currently available endless tape cartridges for use with the apparatus according to the present invention will be described to provide an understanding of the function of such cartridges.

Figure 1A:
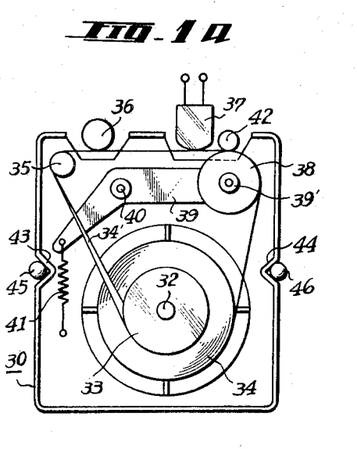
FIGS. 1a and 1b are plan views of cartridges for use with an automatic playing apparatus according to the present invention.

Referring to the drawings, particularly to FIG. 1a, a cartridge 30 comprises a rectangular container having a base 31 on which is mounted a post 32 having a rotary disc 33 thereon on which is wound a spool of magnetic tape 34. A portion 34' of the tape 34 passes from a tape guide 35 past an end mark detector or search means 36, over a magnetic head 37 and a pinch roller 38 and terminates at the spool of tape. The pinch roller 38 is supported by a shaft 39' resting on one end of a lever 39 which is pivotally supported on a pivot 40 fixed to the base 31, and which is urged by a spring 41 in the direction of the capstan 42. In this manner, the tape 34 is caused to run between the capstan 42 and the pinch roller 38 as the spring 41 causes the pinch roller 38 to pinch the tape between it and the capstan 42.

Retainers 45 and 46 are provided and are inserted into depressions 43 and 44 formed in the sides of the cartridge so that the cartridge 30 will be snugly retained in place when the retainers are pressed into the depressions. The cartridge 30 is downwardly retracted from the "play" position against the force of the retainers 45 and 46 to move the capstan 42 away from the pinch roller 38 so that the driving of the tape 34 is terminated. There are, however, some instances in which without provision of the lever 39 of this kind the pinch roller 38 supported by the shaft 39' can bear on the capstan 42 by the action of the retainers on the oblique surfaces of the depressions 43 and 44.

Figure 1B:
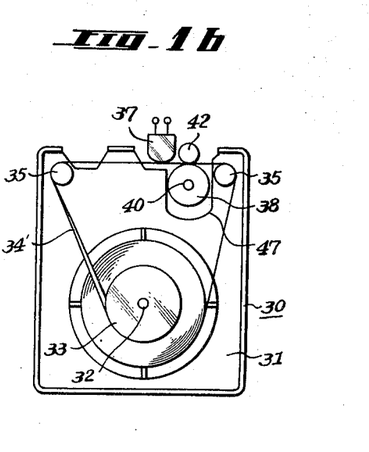

As seen from FIG. 1b, the cartridge 30 is substantially the same as that shown in FIG. 1a, except that the pinch roller 38 is not mounted in the cartridge and the driving of the tape 34 is effected by the vertically movable pinch roller which is mounted on the cabinet of the apparatus and extends into a slot 47 extending through the wall of the cartridge. In FIG. 1b, like parts to those of FIG. 1a are represented by like reference numerals. These cartridges are commonly characterized in that the tape feed depends upon the stage of movement of the cartridge which is slidable within a case forming part of the apparatus. Therefore, such movement of the cartridge is taken advantage of for the present invention.

Figure 2A:
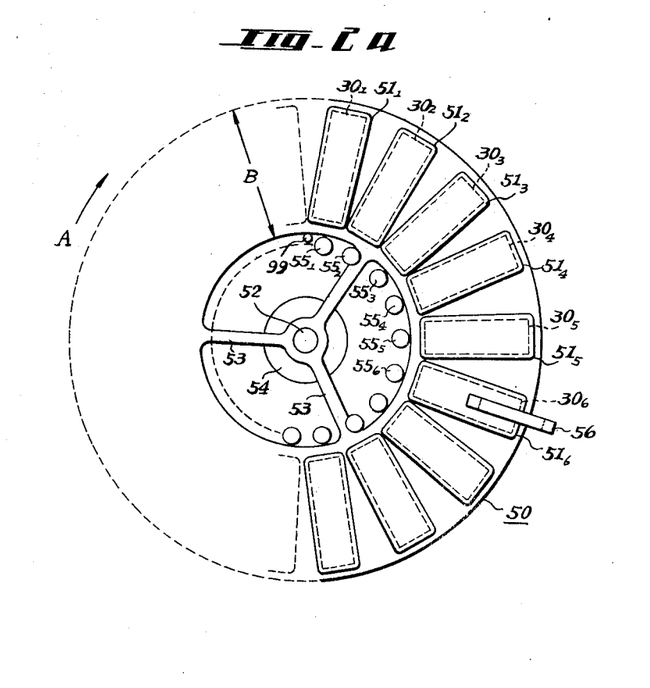
FIGS. 2a and 2b are plan views of two embodiments of the automatic playing apparatus, looking from above.

Referring now to FIG. 2a, an annular-shaped casing 50 is provided with a plurality of radially extending recesses $51_1$, $51_2$ . . . to accommodate a plurality of cartridges 30 so that the cartridges are slidable therewithin. The casing 50 is carried by three arms 53 integral with and radially projecting from a shaft 52 which is rotatably mounted in a shaft bearing (not shown) fixed to the cabinet of the apparatus and which is coaxial with the shaft of a spring motor 54 positioned in the cabinet.

Push buttons are provided opposite each recess 51, and are indicated at $55_1$, $55_2$, and $55_3$ . . . and are mounted on the casing 50, and are designed to follow rotation of the casing and to be engaged by engaging means, to be described hereinafter, when depressed. Rotation is imparted to the casing 50 in the direction of arrow A by the spring motor 54 in which energy is stored. A desired portion of the casing can be brought to and in registry with the play position by depressing one of the push buttons 55 before rotation begins.

The endless tape cartridge has upper and lower walls which are shorter in length than the side walls, and thus only a comparatively small radial distance B is required in the casing 50 to accommodate the cartridges. As a result, it is possible to make the apparatus as a whole compact. In view of the fact that a typical small dimensioned cartridge accommodates a tape about ⅛ inch wide and will thereby cause the cartridge to have a thickness of only 0.39 inch and a width of 2.36 inches, it is obvious that the overall apparatus will be compact.

As an indicator of the contents of the tape, a label or the like can be attached to the lower wall of the cartridge so that the cartridge to be chosen can be identified and readily played by depressing the corresponding push button positioned opposite to the desired cartridge.

Figure 2B:
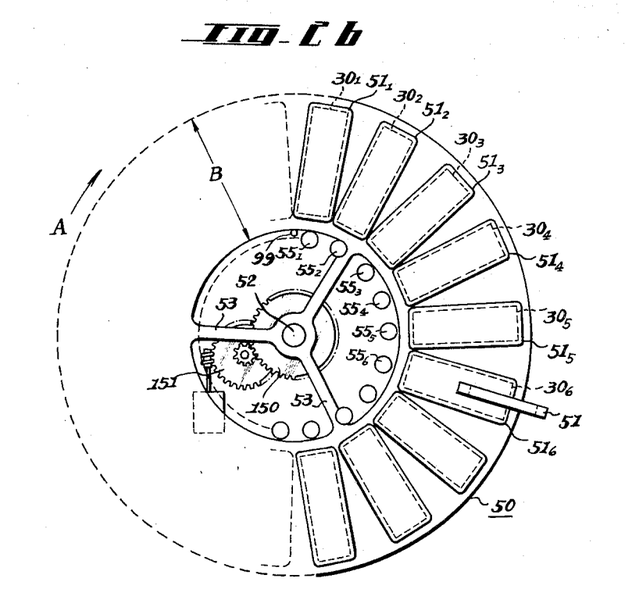

The cartridge $30_6$ shown in FIG. 2b is in the "standby" location and is moved to the "play" position by arms 58 and 59 of a lever member 56 which is adapted to reciprocate the cartridge into and out of the casing 50.

Figure 3:
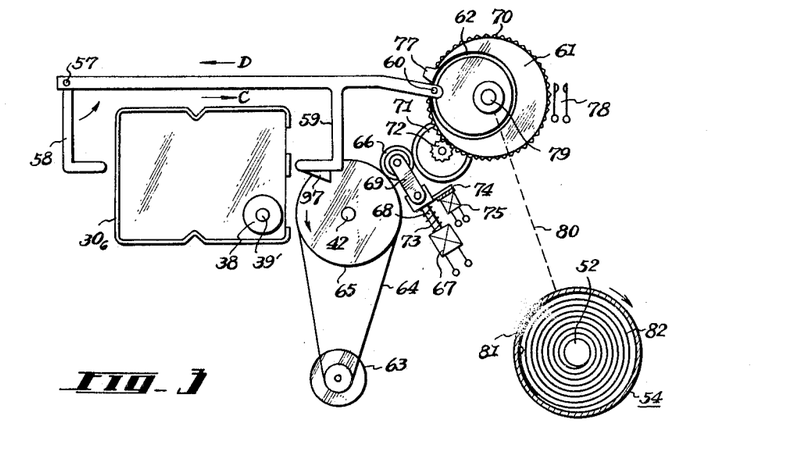
FIG. 3 is a schematic representation of the cartridge operating mechanism.

Referring to FIG. 3, the cartridge operating mechanism and its linkages will be described in greater detail hereinafter. Pivoted on a pin 57 at one end of the lever member 56 is one arm 58, and a second arm 59 projects from the midportion thereof. The cartridge is securely engaged by the arms 58 and 59 which grasp the respective walls thereof. The arm 58 is biased in the direction of the arrow by a spring (not shown) but inward movement of the arm is limited by a stop (not shown). Rigidly fixed to the other end of the lever member 56 is a crank pin 60 which engages in an annular groove 62 eccentrically formed in a cam wheel 61. Rotation of the cam wheel 61 will cause the crank pin 60 carried by the groove 62 to reciprocate the lever member 56 in the direction of arrow C or D while arms 58 and 59 grasp the cartridge.

A motor 63 is provided for imparting rotation to cam wheel 61 by a belt 64 around a flywheel 65 carrying the capstan 42. Positioned between the flywheel 65 and a roller 71 having a gear 72 thereon meshing with a cam gear 70 associated with cam wheel 61 is an electromagnetic plunger 67 which has an actuator 68 pivotally mounted on one end of a lever 69 which in turn has a rotatable idler 66 at the other end thereof.

Figures 4, 5, 6, 7, 8:
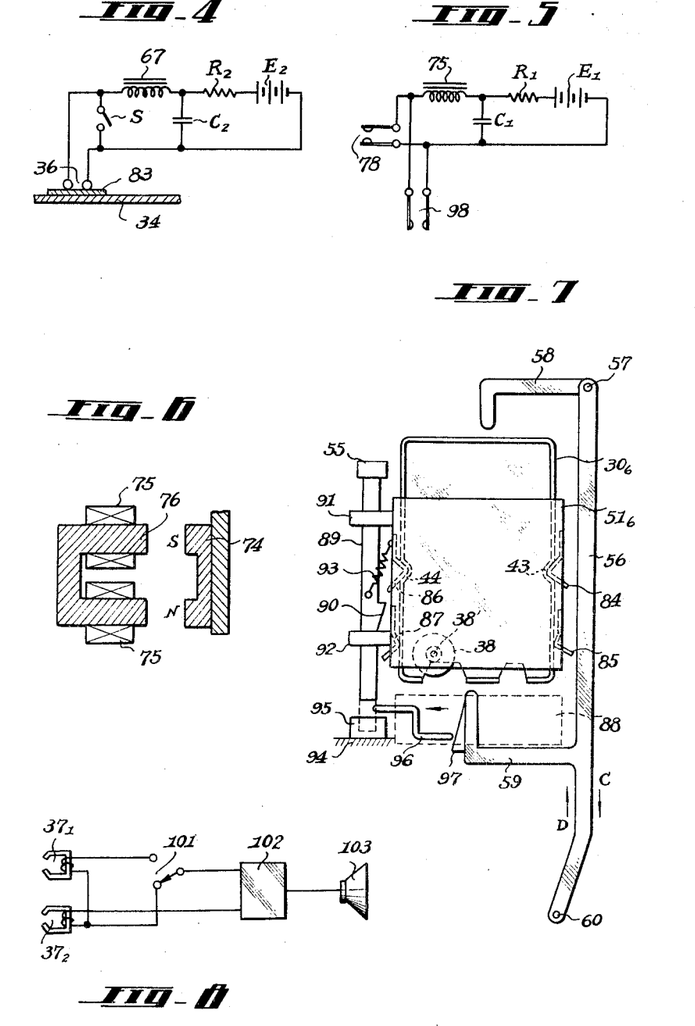
FIG. 4 is a circuit diagram for operating an electromagnetic plunger.
FIG. 5 is a circuit diagram for operating an electromagnetic coil.
FIG. 6 is a cross section of the electromagnetic coil of FIG. 5.
FIG. 7 is a schematic elevation view of a push button link for arresting movement of the casing, and the parts in the vicinity thereof.
FIG. 8 is a circuit diagram for selecting a track on the tape in the cartridge which is to be reproduced.

The actuator 68 on which a spring 73 is wound is adapted to be moved against the action of spring 73. A permanent magnet 74 of ferrite is rigidly fixed to the actuator 68 while the open end of a magnetic circuit core 76 having an electromagnetic coil 75 thereon is placed in a position to which the permanent magnet is moved upon energization of the electromagnetic plunger 67. The details of the permanent magnet and the electromagnetic coil are shown in FIG. 6.

Now once the plunger 67 is energized by applying an impulse thereto and hence the actuator 68 is retracted against the force of the spring 73, the idler 66 is retracted to thereby impart rotation from the motor 63 through flywheel 65, roller 71 and gear 72 to the cam 61. This will cause the permanent magnet 74 to be magnetically attracted to the core 76 and the actuator will be held in its position. For this reason, if energizaation of the plunger 67 is interrupted, the actuator 68 maintains its position rather than being pushed by the spring 73 to disengage idler 66 to thereby enable the cam 61 to be continuously rotated.

At the periphery of the cam 61 and integrally formed therewith is a lug 77 which acts to close a normally open switch 78 arranged to be engaged by the lug when the cam is rotated about half a revolution. Closing of the switch 78 causes a flow of current into the coil 75 in a direction which will cause the coil to produce a magnetic flux opposite to the magnetic flux produced by the permanent magnet 74.

Thus, when the coil 75 is energized, the attractive force existed between the magnet 74 and the core 76 is removed allowing the spring 73 to push the actuator 68 back to its normal position. The idler 66 is, therefore, moved away from the flywheel 65 and the roller 71 to terminate rotation of the cam 61.

The spring motor 54 comprises a belt 80 as shown by the broken lines of FIG. 3 through which the camshaft 79 is coupled to the shaft 52 carrying the casing 81, and a coil spring 82 having one end attached to the shaft 52 and the other engaged with the casing 81. Rotation of the cam 61 initiates rotation of the casing 81 in the direction of the arrow to store energy in the coil spring 82 for giving the shaft 52 further rotation. Hence the spring 82 stores energy therein due to the rotation of the cam 61 until it can no longer be coiled and the belt 80 slips on the shaft 52.

The electromagnetic plunger circuit to initiate rotation of the cam 61 is illustrated in FIG. 4. The current from the power mains $E_2$ flows through a resistor $R_2$ having a high resistance value into a condenser $C_2$ to be charged. An end mark 83 of aluminum foil on the tap near the end thereof closes the contacts of a detector means 36 for detecting the end mark as the end of the tape passes so that the charge on the condenser $R_2$ which is fed to the plunger 67 causes the latter to be energized initiating rotation of the cam 61. At S is indicated an auxiliary switch which can be manually operated to initiate rotation of the cam. The condenser $C_2$ and the high resistance value resistor $R_2$ are incorporated in the circuit to minimize current consumption from the power main $E_2$. A suitable modification of the present invention may be, however, used in which even without the condenser and the resistor the same end as described above can be accomplished with the use of a minimum amount of current; movement of the end mark away from the detector means can deenergize the plunger.

Referring to FIG. 5, the closing of the switch 78 completes a circuit to energize the electromagnetic coil 76, which circuit is from the power mains $E_1$ through a high resistance value resistor $R_1$ and a condenser $C_1$. The sequence of events that occurs as a result of closing the switch is substantially the same as in the electromagnetic plunger circuit.

Once the permanent magnet 74 of ferrite and having its pole, see FIG. 6, has approached the core 76, the magnetic circuit is closed so as to establish a powerful attractive force therebetween. The U-shaped core 76 is used in this arrangement; however, it is possible to utilize a jar shaped core therein.

The object of this electromagnet arrangement is to initiate rotation of the cam when the end mark on the tape is engaged with the detecting means and to terminate rotation thereof when the cam 61 brings the lug 77 into engagement with the switch 72, whereby the lever member 56 is moved so that the cartridge is brought to the play position. Any other equivalent type of electromagnet means can be employed.

As shown in FIG. 7, the cartridge $30_6$ in the stand-by position is adapted to be moved to the play position by a mechanism which is located in the casing of the apparatus at a position to the cartridge $30_6$ in the stand-by position to be played. The cartridge moving mechanism comprises a link 89, the top portion of which is the push button 55, and a projection 90 which is integrally formed on the link. Guides 91 and 92, which are rigidly secured to the casing 50 are provided with rectangular openings through which the push button link 89 is slidable.

Two pairs of leaf springs 84 and 86 and 85 and 87 are positioned in the recess $51_6$ and serve to hold the cartridge $30_6$ in the two positions, namely, the stand-by position shown in FIG. 7 and the play position. When the cartridge is held in the stand-by position, the one pair of springs 84 and 86 is in register with the depressions 43 and 44, while when it is held in the play position, the other pair of springs 85 and 87 is in register with the depressed portions.

Securely mounted on the cabinet of the apparatus (not shown) is a guide 88 which is adapted to snugly and tightly receive the front portion of the cartridge $30_6$ therein to thereby secure the optimum engagement of the pinch roller 38 with the capstan 42 and of the tape 34 with the head 37 and the detector means 36. The pair of the springs 85 and 87 can, if desired, be mounted on the guide 88.

The link 89 is normally urged upwardly by the spring 93 extending from the casing 50 and the push button 55 projects beyond the level of the casing. In order to move the cartridge $30_6$ to the play position, the push button 55 is depressed downwardly to bring the projection 90 into engagement with the guide 92 so that the link is held in its lowered position. At this point, a raised portion 95 on the cabinet 94 in the path of the link 89 as it rotates with casing 50 is engaged by the tip of the link 89. In this manner, rotation of the casing 50 is arrested by engagement of the link 89 with the raised portion 95. The tip of the link 89 is preferably formed of elastic material to minimize the shock produced between the raised portion 95 and the link at their engagement.

In the cabinet indicated at 94 is slidably mounted a release lever 96 which is adapted to push the link 89 away from casing 50 to cause the projection 90 to move out of engagement with the guide 92. The lever 96 is normally urged in the direction of the arm 59 by a spring (not shown), but is slidable toward the link 89 and the lever is thrust away from arm 59 by a bevelled portion 97 integrally formed on the end of the arm 59 when the reciprocating lever 56 is moved to bring the cartridge to the stand-by position. Such movement of the lever 56 permits the link 89 to move out of engagement of the guide 92.

Operation of this embodiment of the apparatus of the invention should now be apparent.

Assuming that two of the cartridges are desired to be played successively, to this end the respective push buttons 55 must be in turn depressed to bring the projections 9 into engagement with the guides 93.

After the switch S of FIG. 4 is closed, the current through the plunger 67 causes the actuator 68 to be retracted compressing the spring 73. At this point, the actuator is maintained in its position even if the switch S is opened, since the core 76 attracts the permanent magnet 74 due to the attractive force therebetween. With retraction of the actuator 68, the idler 66 is also retracted into engagement with the flywheel 65 and the roller 71 so that rotation is imparted through the gears 72 and 70 to the cam 61.

Meanwhile, the casing 50 which is rotated by the spring motor 54 is caused to terminate its rotation at the position where the lower end of the tube 89 having the first push button 55 which is depressed therein comes into engagement with the raised portion 95. At this position the reciprocating lever 56 is in alignment with the cartridge to be played. As a result, the lever 56 can grasp the cartridge with the arms 58 and 59.

Rotation of the cam 61 causes the lever 56 to be moved in the direction of arrow C from the stand-by to the play position, and the retainers 85 and 87, such as leaf springs, are forced into depressions 43 and 44 while the forward end of the cartridge is rested in the guide 88. At the same time, the lug 77 closes the switch 78 which energizes the coil 75 in the manner as described above (FIG. 3) to end the magnetic attraction between the magnet 74 and the core 76 so that the actuator 68 is returned to its initial position under the influence of the spring 73. When this occurs, the idler 66 is moved away from the flywheel 65 and the roller 71 to terminate rotation of the cam. This also terminates reciprocation of the lever 56 at the end of its motion in one direction and positions the cartridge in the proper location for playing in which the roller 38 engages the capstan 42 to drive the tape 34 which is reeled over the head 37 and the detector means 36.

In the play position, the cartridge is urged by the arm 58 in such a manner that engagement of the roller 38 with the capstan 42 and of the tape 34 with the head 37 is so effectively brought about that the tone quality is improved. In this embodiment, a spring (not shown) is provided for rotating the arm 58 about the pin 57 to tightly hold the cartridge in association with the other arm 59. The arm 58 can, however, be formed of a resilient material so as to make use of the inherent elastic force to urge it in the direction of the cartridge.

When the tape feed comes to an end, the end mark 83 provided on the end thereof is caused to contact the detector means 36. This energizes the electromagnetic plunger 34 to bring the idler 66 into engagement with the flywheel 65 and the roller 71, causing the cam 61 to be rotated further. Rotation of the cam 61 at this time moves the reciprocating lever 56 in the direction of arrow D as the crank pin 60 carried by the annular groove 62 is caused to cooperate with the cam. With retraction of the cartridge to the stand-by position, engagement of the pinch roller with the capstan is ended causing the end of the playing of the tape. When the cartridge is snugly received within the recess 51 in a manner such that the retainers 84 and 86 are urged toward the depressions 43 and 44 to engage therein, the bevelled portion 97 of the arm 59 is engaged with the release lever 96 for causing it to be moved leftwards as shown in FIG. 7, and the push button link 89 is also moved to the left by movement of the release lever 96. The projection 90 thus is released from its engagement with the guide 92 so that the spring 93 can urge the push button link 89 upwardly toward its normal position.

Upon disengagement of the push button link 89 from the raised portion 95, interference with rotation of the casing 50 is ended and the casing is rotated further under influence of the spring motor 54 until the push button link 89 for the cartridge desired to be played and which has been depressed by the corresponding push button is aligned with the reciprocating lever 56.

In the time interval between the disengagement of the first push button link 89 from the raised portion 95 and the engagement of the next depressed link 89, the crank pin 60 is carried and guided by the groove 62 while the reciprocating lever 56 is caused to be held substantially at a standstill for a portion of the rotation of the cam 61.

When movement of the lever 56 is again initiated, the next cartridge 30 is brought into the play position to allow the tape 34 therein to be played and the end mark 83 on the end of the tape 14 thereof is detected by the detector means 36. At this point, the cartridge 30 is moved to the stand-by position. In this manner, the cartridges are played in accordance with a specific sequential program.

An unexpected disadvantage of the depression of the push buttons is that after the last cartridge is positioned within its recess nothing interferes with rotation of the casing so that the casing is rotated until the spring motor is run down. The switch 98 is, however, provided (see FIG. 5) to supply a pulse of current to the electromagnetic coil 75 when switch 98 is closed so that the idler 66 is moved out of engagement with the flywheel 65 and the roller 71 so that rotation of the cam 61 is terminated to allow the apparatus as a whole to come to a standstill. It is apparent that the closing of switch 98 effects initiation of rotation of the casing.

A push button 99 different from the push buttons 55 is provided on the casing for closing the switch 98 and is depressed after the pushbutton 55 for the last cartridge to be played. Provided on the bottom of the push button 99 is a link (not shown) similar to link 89 and which is adapted to be retained in a position by frictional force and to project out of the casing when the button 99 is depressed. As the casing is rotated, the push button 99 and its link are carried along in its rotation, and the switch 98 is positioned in the path of circular motion of the link, but out of the path of circular motion of the push button links 89. This causes the link for pushbutton 99 to engage the switch 98 when the button 99 is depressed. Although the casing starts rotating on disengagement of link 89 of the push button 55 after the last cartridge is played, the link of the other push button 99 engages the switch 98 and closes it so that rotation of the casing is terminated.

As clearly shown in the circuit of FIG. 5, the same effect as is obtained with the closing of the switch 78 is obtained by the closing of the switch 98, that is to say, rotation of the cam 61 is terminated to cause the reciprocating lever 56 to end its movement. The disadvantage as previously mentioned is remedied by the provision of the switch 98 and push button 99. If it is desired to play the cartridge again, the push button 99 is pulled to open the switch 98.

The time at which the push button 99 is depressed is not always limited to the time that the last chosen cartridge is played. Depression of the button 99 may be effected whenever a cartridge is chosen.

This invention also contemplates the provision of means enabling the cartridge selecting mechanism to serve for the selection of a track from among several tracks on the tape when necessary. This may be accomplished by either of two arrangements, one providing a plurality of magnetic heads, one opposed to the position of each track and means for energizing the head for the selected track by changing over a switch, and the other causing the head to be moved across the tape to the selected track.

FIG. 8 shows a circuit in which a selected track is played by means of the former arrangement. This circuit comprises magnetic heads $37_1$ and $37_2$ which are positioned opposite two tracks on the tape, a change-over switch 101 connected to an amplifier and over the other of said heads, and a speaker 103. With this arrangement, the output produced in the magnetic head $37_1$ or $37_2$ is applied to the amplifier by changing over the switch. The track selecting mechanism will be described below in connection with FIGS. 9a and 9b.

Figure 9A:
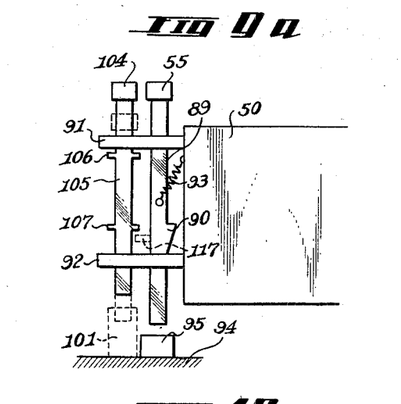
FIG. 9a is a schematic elevation view of a mechanism for selecting a track on the tape for the cartridge.

Slidably mounted in each of the pairs of guides 91 and 92 for carrying the push button link 89 is a push button link 105 which can also be engaged with these guides when a push button 104 thereon is depressed. The push button link 105 is provided with lugs 106 and 107 that are engageable with the guides to arrest vertical movement of the link. The link 105 can be positioned in the position shown by thhe broken or solid lines when the button 104 is depressed or pulled up. The switch 101 is mounted on the cabinet 94 so as to be in the path of end of the links 105.

Figure 9B:
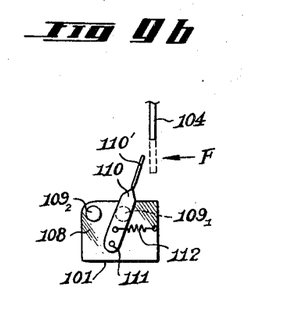
FIG. 9b is a schematic view of switch means operated by the mechanism illustrated in FIG. 9a for transferring a magnetic head.

The details of the switch 101 are illustrated in FIG. 9b and it comprises terminals $109_1$ and $109_2$ secured to an insulated base plate 108, and an arm 110 pivoted at a point 111 thereon and being urged clockwise by a spring 112 stretched between the arm and the plate. The rotation of the arm 110 is arrested by a stop (not shown) at the point where it engages the terminal $109_1$. The free end 110' of the arm 110 is made of a resilient material to absorb the shock produced when it is engaged by the push button link 105. When the push button link 105 is in the position shown by the solid lines the end of the link is spaced from the free end 110' of the arm 110. The arm 110 is connected to the amplifier 102 and is maintained in engagement with the terminal $109_1$ connected to the magnetic head $37_1$ under influence of the spring 112. As a result, the track on the tape which is against the magnetic head $37_1$ is played. When the push button 104 is depressed, the push button link 105 engages the free end 110' of the arm 110 as the casing 50 is rotated in the direction of arrow F in FIG. 9b so that the arm 110 is rotated counterclockwise against the bias of the spring 112 and thus engages the terminal $109_2$ connected to the magnetic head $37_2$. This causes the switch 101 to be changed over to connect the magnetic head $37_2$ to the amplifier and the track which is against head $37_2$ is played.

It is apparent from the foregoing that with the arrangement shown in FIGS. 9a and 9b the selection of the track is effected independently for each cartridge. Any type of switch may be employed if it has one circuit and two contacts. The link 105 can be in the form of the link 89 and vice versa.

Figures 10, 11, 12:
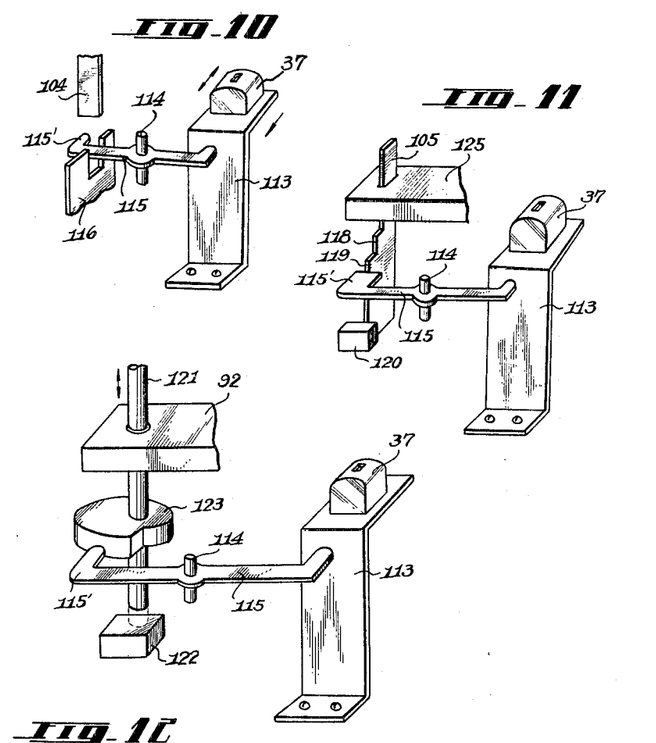
FIGS. 10, 11 and 12 are perspective views showing embodiments of a track selecting mechanism adapted to be operated by means of the head.

The arrangement for changing the position of a head is shown in FIG. 10 in which the arrangement comprises a leaf spring 113 one end of which is mounted on the cabinet and carrying the magnetic head 37 on the other end thereof, and a lever 115 rotatably pivoted on a shaft 114 fixed to the cabinet. The lever 115 is adapted to have one end engage the leaf spring 113 and have the other end extend through a notch provided in one side of a stopping piece or member 116. Rotation of the lever 115 is effected by engagement of the push button link 105 with the end 115' thereof and is limited by the size of the notch in the member 116. The magnetic head 37 is reciprocated in the direction of the arrow of FIG. 10 when the lever is rotated to move it into the position opposite the track selected.

When the lever 115 is not contacted by the end of the push button link 105, the one end thereof is urged clockwise in the figure by the bias of the leaf spring 113 while the other end is engaged by the notch of the member 116 to arrest rotation of the lever 115 so that the magnetic head 37 carried by the leaf spring 113 is held in one position to cause it to engage one track when the tape is driven. When the push button 104 is depressed, the end 115' of link 115 is engaged by the link 105 after rotation of the casing is arrested by the push button 89 which is depressed. This causes the head 37 to be moved an amount limited by the size of the notch in the member 116 and to be positioned opposite the other track.

The push button link 105 is preferably made of elastic material so as to utilize the resiliency inherent in the elastic material for allowing the link to pass above the end portion 115' when its elastic limit is exceeded upon rotation of the casing upon finishing the play of the tape. In order to return the push button link 105 to its normal position when the push button link 89 is returned to its normal position, the latter link may be provided with a projection 117 which engages with a projection 107 integrally formed on the link 105.

A modified form of the push button link for selecting the track on the tape is illustrated in FIG. 11. With this link a track can be selected from more than two tracks. In this embodiment there is provided the link 105 having a plurality of stepped portions 118, 119 . . . equal in number to the number of tracks, and which engages the end 115' of the lever 115. With this link the head 37 can travel against the bias of the leaf spring 113 a distance equal to the horizontal dimension of the respective stepped portion to select the desired track on the tape. Selection of the stepped portions 118, 119 . . . engaging the end 115' is determined by the amount the push button 104 is depressed. The push button link 105 is preferably provided with a scale adjacent to the button 104 to indicate which track is selected. It is essential that a click stop means be associated with the link 105 for facilitating engagement of the end of the link 115 with the stepped portions. As will be seen from the drawing, a retaining member 120 is mounted on the cabinet which, when the end of the lever 115 is engaged with a stepped portion arrests rotation of the casing when it is engaged by the link 105. This arrangement has the advantage that the push button 55 and the link 89 as shown in FIG. 9a can be omitted. It is, however, necessary to provide means that are similar to the release lever 96, the bevelled portion 97 and cooperating with the lever 56 for pushing the link 105 to disengage it from the retaining member 120 when the lever 56 is moved. Instead of using the leaf spring 113, the other similar means might be employed for carrying the magnetic head 37.

An embodiment in which a cam means is substituted for the stepped portions is shown in FIG. 12. A push button link 121 has a cam 123 secured to the mid-portion thereof. The cam 123 is shaped to allow the magnetic head 37 to selectively engage a track by movement of the lever 115. When the push button is depressed, the link 121 is engaged by a retaining member 122 to arrest rotation of the casing 50 and the periphery of the cam engages the end of the lever 115. The position of the end of the lever 115 can be changed by rotating the link 121 so that the magnetic head is moved in response to movement of the lever 115, the end of which is moved in accordance wtih the configuration of the cam 123.

Figures 13A, 13B, 14, 15A:
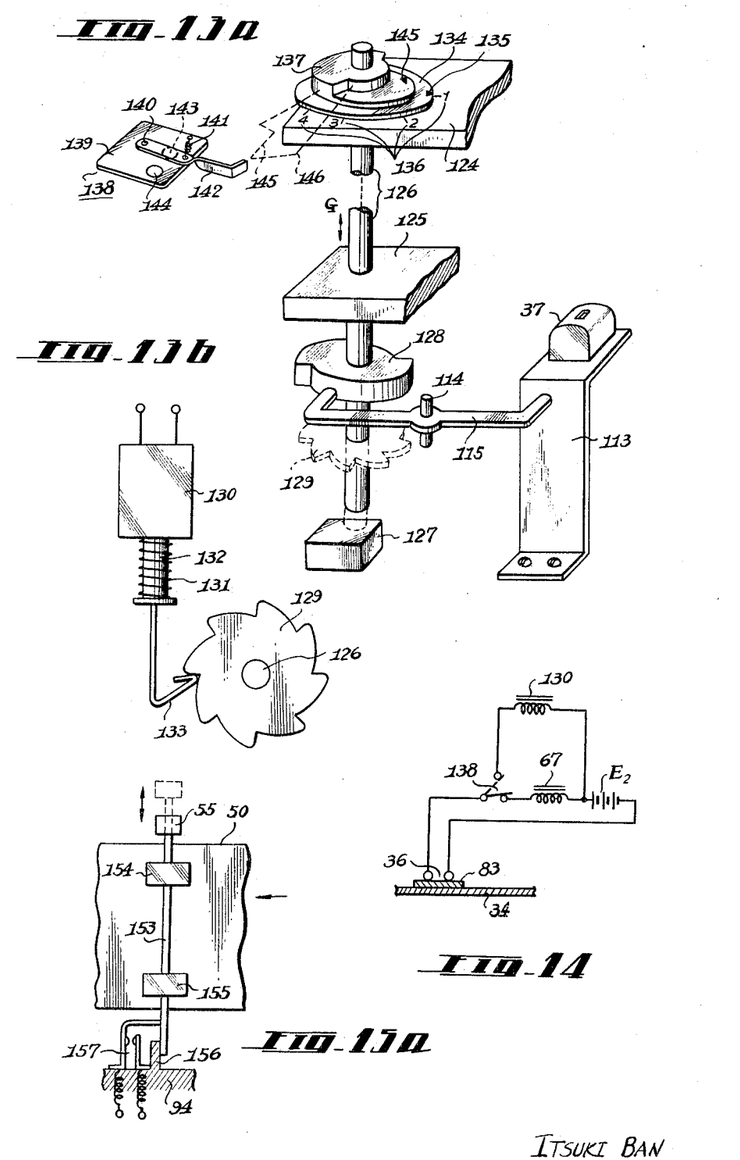
FIGS. 13a and 13b are a perspective view and a partial plan view, respectively, of a mechanism for playing the tape in a manner such that the tracks thereon are successively selected.
FIG. 14 is a circuit diagram of the mechanism for playing the tape in a manner such that the tracks thereon are successively selected.
FIG. 15a is a view of one embodiment of a casing arrest mechanism with a switch for the motor.

Another arrangement illustrated in FIGS. 13a and 13b and 14 is such that any desired tracks out of a plurality of tracks on the tape can be selected in succession. This arrangement comprises essentially a push button link 126 rotatable in guides 124 and 125 mounted on the casing 50 and slidable in the direction of arrow 6. A cam 128 and a ratchet wheel 129 are secured to the link underneath by the end of the push button link 126 when it is depressed and to clear the member 127 when it is raised for arresting and initiating rotation of the casing. The cam, the rotating lever, and the magnetic head shown in FIG. 13a are adapted to operate in the same manner as the corresponding parts shown in FIG. 12.

The cam 128 has symmetrically offset semicircular portions to cause the head traversing the track to reciprocate twice whenever the cam revolves on its axis through an angle of 360°.

The ratchet wheel 129 is as shown in the broken lines in FIG. 13a and is rotated in a clockwise direction by a pawl 133 shown in FIG. 13b which engages a tooth of the wheel when a plunger 130 is energized to retract an actuator 132 against the bias of a spring 131. Rotation of the ratchet wheel 129 causes the cam 128 to be rotated so that the head 37 is moved so as to select the track on the tape.

The arrangement as shown in the figures is adapted to select one track out of four tracks on the tape. A disc 134 is secured to the link 126 above the guide 124 to rotate with the cam 128. The upper surface of the guide 124 is provided with an index scale 136 indicating four tracks, for example, by the numerals 1, 2, 3 and 4, and a pointer engraved on the disc cooperates with the scale to indicate the position of the cam 128 so that the track may be selected as desired. A cam plate 138 is frictionally mounted on the link 126 and rests on the disc 134 in frictional engagement therewith so as to be rotated around the link 126 with disk 134.

A change-over switch 138 is provided which comprises an arm 142 pivotally mounted on a pivot 140 on an insulating plate 139, and is urged in a counterclockwise direction by the bias of a spring 141. This switch which is provided with two contact terminals 143 and 144 forms a "one circuit and two contacts" type switch. Normally, the arm 142 is maintained in engagement with the contact terminal 143 under the influence of the spring, but is engageable with the terminal 144 upon its disengagement from the other terminal 143 when it is pushed so as to be rotated. When rotation of the casing is arrested by engagement of the link 126 with the retaining member 127, the arm 142 is in the position shown in FIG. 13a and is positioned in the apparatus to engage the notched portion of the cam plate 137. From the foregoing, it will be apparent that it depends upon the position in which the notched portion is aligned with the arm as to which of the terminals 143 or 144 is engaged thereby.

A circuit including the switch arrangement 138 is shown in FIG. 14 wherein parts similar to those in FIG. 4 are represented by like reference numerals. When the switch 138 is held in the position shown by the solid lines of FIG. 13a, the circuit will operate the same as that of FIG. 4. After the tape 34 has come to the end mark 83, the signal produced by the end mark causes the plunger 67 to be energized, thus retracting the cartridge to its normal position by movement of the reciprocating lever 56 to terminate the play of the tape. At this moment, the arm 142 engages the notched portion of the cam plate 137. On the other hand, if the arm 142 is caused to engage the periphery of the cam plate, the switch 138 is changed over and in the position shown by the broken lines of the figure. The current from the power mains $E_2$ is directed to the plunger 130 whenever the contact of the end mark detecting means 36 is short circuited by the end mark 83. As a result, the ratchet wheel 129 is rotated by one tooth causing the head 37 to traverse the tape by one track separation distance. In order to effect conversion from engagement of the head 37 with two tracks to engagement thereof with four tracks, there may be provided a pointer 145 mounted on the cam plate 137 and a scale (not shown) on the disc 134 to indicate each track to be played so that an angle formed by the arm 142 engaging with the periphery of the cam plate 137 is adjustable by setting the pointer on the scale. As shown in FIG. 13b, one plunger mounted on the cabinet is sufficient for operating the pawl 133 to mesh with the tooth of the ratchet wheel 129 when rotation of the casing 50 is arrested.

An electric motor can be substituted for the spring motor to drive the casing 50. Referring to FIG. 2b, the casing 50 is carried by the arms 53 which are integrally formed on the shaft 52. The shaft is rotatably mounted in a shaft bearing (not shown) secured to the cabinet. A motor 152 is provide with a worm gear 151 in mesh with a spur gear 150 for rotating the shaft 52 and rotates the casing 50 in the direction of arrow A. The motor is controlled by a power source switch which is engaged by and disengages the push button link 89. The cartridge operating mechanism suitable for use in the apparatus of FIG. 2b is the same as for that of FIG. 2a and is illustrated in FIG. 3, and it will not be necessary to describe it in detail.

One form of casing arrest mechanism with a motor drive control switch, see FIG. 15a, comprises a push button link 153 having a push button 55 at the upper end thereof, and guides 154 and 155 secured to the casing 50 and slidably carrying the link. When the push button link 55 is in the position shown by the solid lines of the figure, that is to say, the link is depressed, it is engaged by a raised portion 156 during movement of the casing in the direction of arrow J. This stops the casing 50 in its rotation and opens the switch 157. The switch 157 is connected between the electric motor and the power mains to deactuate the motor when the switch is opened. As illustrated in FIG. 2b, the motor 152 imparts rotation through the worm gear 151 to the casing 50 so that torque transmission in a reverse direction is not effected. For this reason, the lower end of the link 153 is maintained in position against the raised portion 156 and the switch 157.

Figures 15B, 15C:
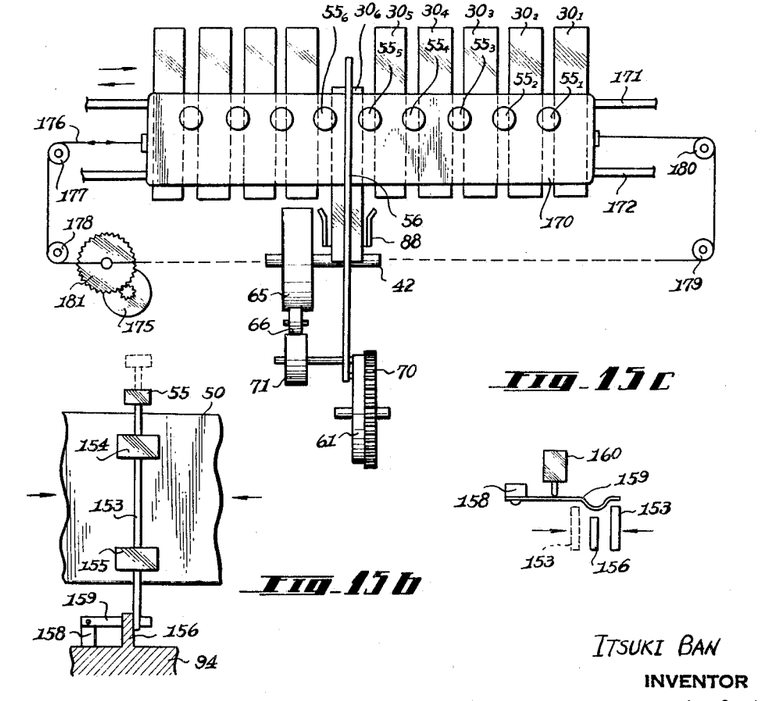
FIGS. 15b and 15c are views of another embodiment of a casing arrest mechanism with a switch for the motor.

A modified form of the casing arrest mechanism is shown in FIGS. 15b and 15c and is adapted to stop rotation of the casing by engagement of the link 153 with the raised portion 156 when the casing is rotated in the direction of either arrow $K_1$ or $K_2$. Pivotally mounted on a support 158 secured to the cabinet 94 is a leaf spring 159 which has a curved portion at the free end thereof. The leaf spring 159 is urged in the direction of a micro switch 160 to press an actuator 161 thereof by the lower portion of the link 153 which comes into engagement with the curved portion as the casing 50 is rotated in the direction of arrow $K_1$ so that the switch 160 is opened. As shown in the figures, the switch 160 is also opened by the lower portion of the link 153 which engages the curved portion when the casing is rotated in the reverse direction, the direction of arrow $K_2$. It will be understood that the micro switch 160 serves as the motor drive control.

With the arrangement described above, engagement of the push button link 153 with the raised portion 156 is precise so that rotation of the casing is promptly arrested and the cartridge is properly positioned. Thus, this modified form of the mechanism enables the casing to be rotated in either direction and promotes compactness without use of relay means and simplicity of the apparatus of this type.

The apparatus shown in FIG. 2b is operated in the same manner as that of the apparatus of FIG. 2a, that is to say, the switch S is closed and then movement of the reciprocating lever 56 is terminated when all the selected cartridges are played according to the respective depressed push buttons. It should be noted that the push button link for push button 99 is adapted to open the switch 157 simultaneously with closing of the switch S. Thus, upon termination of movement of the reciprocating lever 56, the electric motor is deenergized to thereby terminate the operation of the apparatus.

Figures 16A, 16B:
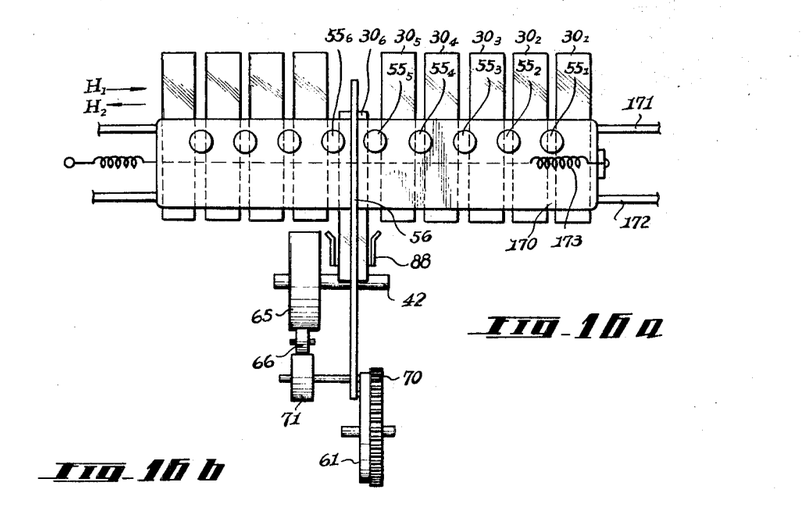
FIGS. 16a and 16b are plan views of another embodiment of the present invention having a casing wherein a plurality of the cartridges are rectilinearly arranged therein.

The apparatus according to the present invention can also have a rectangular casing as shown in FIG. 16a. The casing 170 having a rectangular shape is adapted to be reciprocable in the direction of its length in the direction of arrow $H_1$ or $H_2$ along guide poles 171 and 172. A plurality of cartridges are positioned parallel to each other and removably positioned in the casing 170. A latch spring 173 engages with the end of the casing 170 and urges it leftwards.

After manually pressing the casing in the direction of arrow $H_1$, against the bias of the spring 173, the push buttons 55 are depressed according to the cartridges it is desired to play and then pressure on the casing is released so that movement of the casing in the direction of arrow $H_2$ is initiated to move the cartridges from right to left. Movement of the casing is arrested by means of the buttons 55 engaging a raised portion on the casing similar to the raised portion 95 of FIG. 7. FIG. 16a shows the cartridge $30_6$ held in the play position by the reciprocating lever 56 with the pinch roller in engagement with the capstan 42 all by the same mechanism as shown in FIGS. 3–7.

The disadvantage in the lateral movement of the casing 170 is that engagement of the links of the push buttons with the raised portion causes a shock to the apparatus and the parts thereof which may produce trouble, especially if the movement is over a long distance. Means can be provided for avoiding trouble as mentioned above. This can be accomplished by providing a governor to decrease speed of movement of the casing 170. Such a governor may also be employed in the annular casing 50 illustrated in FIG. 2a.

Referring to FIG. 16b in which an electric motor 175 is used instead of the spring motor for driving the casing 170 of FIG. 16a, a nylon string 176, one end of which is tied to one end of the casing, passes from pulleys 177 and 178 round an axle 182 of a gear 181 and then over pulleys 179 and 180 and is tied to the other end of the casing. The electric motor 175 rotates the pinion meshed with the gear 181 to thereby move the casing. Two switches (not shown) are disposed at the ends of the casing to reverse the motor so that the casing can be reciprocally moved along the guide poles 171 and 172. The means for selecting the cartridges to be played is substantially the same as in the apparatus of FIG. 16a.

Figures 17, 18, 20, 21:
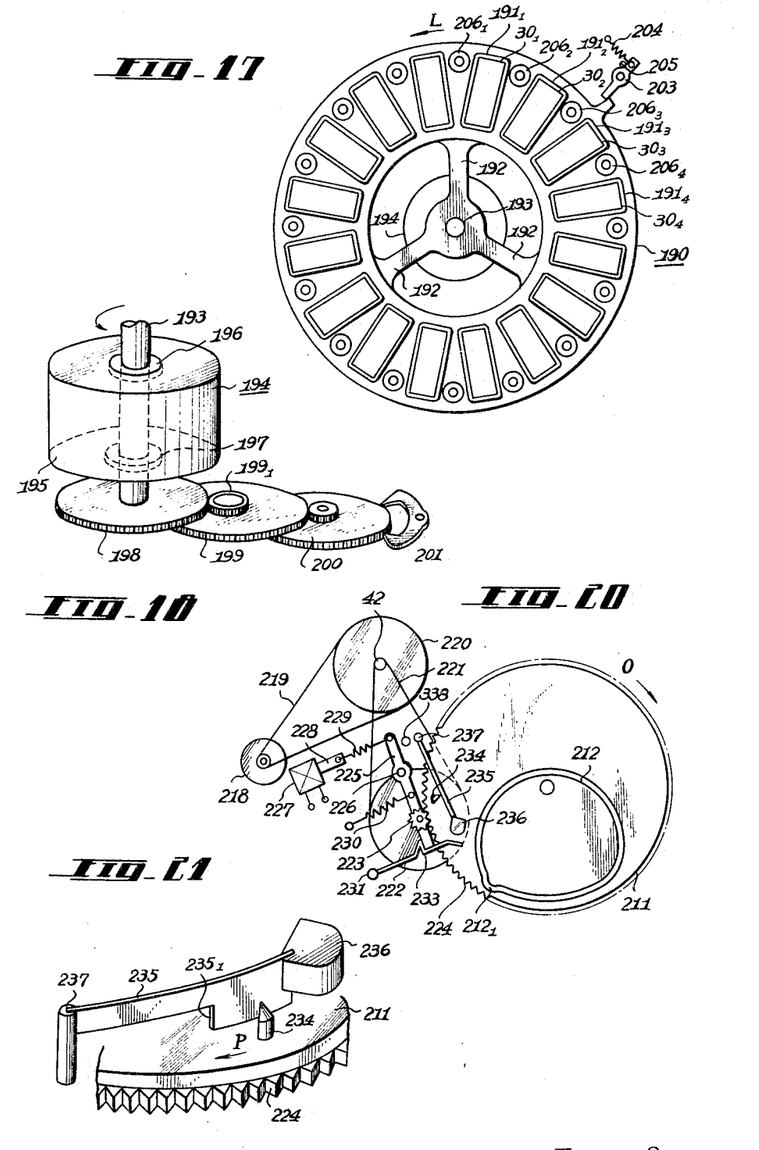
FIG. 17 is a plan view of still another embodiment of the present invention having a casing with an annular shape.
FIG. 18 is a perspective view of a spring motor for driving the casing as shown in FIG. 17.
FIG. 20 is a plan view showing details of the cartridge operating mechanism of FIG. 19.
FIG. 21 is an enlarged perspective view of a principal part of the mechanism of FIG. 20.

Alternative forms of the annular casing for the apparatus and the cartridge operating mechanism therein are shown in FIGS. 17–23. Referring to FIG. 17, an annular casing 190 has a plurality of radial recesses $191_1$, $191_2$, $191_3$ . . . removably accommodating a plurality of the cartridges $30_1$, $30_2$, $30_3$. . . . The casing 190 is carried by three arms 192 integral with and radially projecting from a shaft 193 which is rotatably mounted in a shaft bearing (not shown) fixed to the cabinet. A spring motor 194, see FIG. 18, is provided under the casing 190 and comprises a housing 195 secured to the cabinet beneath the casing, shaft bearings 196 and 197 provided therewithin, and a coil spring, the free end of which is engaged with the inner periphery of the housing 195, the other end of which is wound around and secured to the shaft 193.

The shaft 193 has coupled thereto a train of multiplying gears 198, 199 and 200, and rotation thereof is regulated by a governor 201 meshing with the gear 200. The gear 198 is adapted to slide along the pinion $199_1$ of gear 199 when the casing 190 is rotated in a direction opposite to that of arrow L in order to store energy in the coil spring. When energy stored in the spring is released to rotate shaft 193 in the direction of arrow L, rotation of the shaft 193 is regulated by the governor 201 so that the casing 190 rotates slowly in the direction of arrow L. At the outer periphery of the casing 190 integrally formed therewith is a boss 202 which engages a lever 203 pivotally mounted on the cabinet to arrest rotation of the casing. The lever 203 is urged counterclockwise by the bias of a spring 204, but its rotation is arrested by engagement with a pin 205 secured to the cabinet. When the lever 203 is rotated clockwise against the bias of the spring to release the boss 202 therefrom, rotation of the casing 190 in the direction of arrow L is initiated. A plurality of push buttons $206_1$, $206_2$ . . . are provided, one for each cartridge, to effect engagement with a raised portion when the desired push button is depressed.

Figures 19, 21:
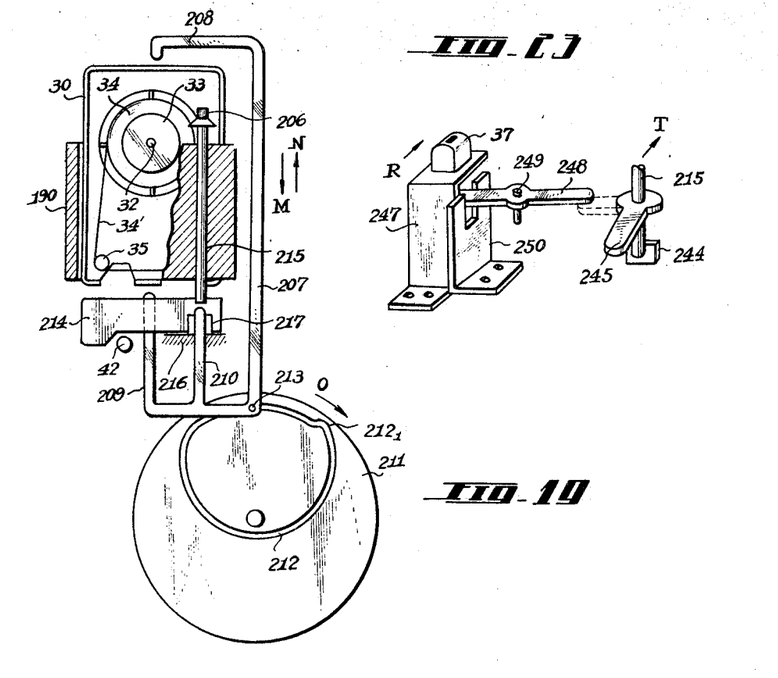
FIG. 19 is a view, partly in section, of a cartridge operating mechanism for the casing shown in FIG. 17.

As shown in FIG. 19, a reciprocating lever 207 has arms 208, 209 and 210 thereon and is adapted to carry the cartridge in a reciprocable manner. Provided at the lower end of the lever 207 is a crank pin 213 which is engaged in a groove 212 in a cam wheel 211. When the cam wheel 211 is rotated, the lever 207 is caused to reciprocate by movement of the crank pin 213 in groove 212. As a result, the cartridge can be moved into two positions, namely, the stand-by and play positions, by the lever 207. A guide 214 is provided for receiving the one end of the cartridge to produce engagement of the tape with the head to provide good tone quality during reproducing. FIG. 19 shows the parts in the position in which the cartridge is retracted from the play position. The arm 210 pushes the push button link 215 to its normal raised position while disengaging the link 215 from a raised portion 217 mounted to the cabinet. The casing 190 is then rotated until the next depressed push button link is engaged by the raised portion 217. In the meantime, the reciprocating lever 207 is held substantially in the illustrated position since the crank pin 213 slides along the substantially rectilinear portion of the groove 212 which is provided adjacent the circumference of the cam wheel 211. A portion of the groove 212 has a somewhat conical shape as indicated at 212, to enable the lever 217 to further retract the cartridge and to space not only the arm 210 from the link 215, but also the arms 208 and 209 from the walls of the cartridge so that rotation of the casing 190 is not interfered with. Subsequently, rotation of the cam wheel 211 in the direction of arrow O causes the next selected cartridge to advance toward the play position, and thus the one end of the cartridge is moved into the guide 214.

During the time the cam wheel 211 is rotated through 360°, its rotation can be automatically suspended by a mechanism illustrated in FIG. 20 to allow the cartridge to be played while held in the play position.

After the playing is finished, a portion of the tape on which no acoustic signal is recorded is passed over the magnetic head. The absence of a signal on the tape causes a circuit which is incorporated in a volume amplifying circuit to produce an output to initiate rotation of the cam wheel to move the cartridge to the stand-by position.

In FIG. 20, the cam wheel 211 and the groove 212 are in relative positions such that the cartridge is almost in the play position. Rotation is imparted from an electric motor 218 to the cam wheel 211 through a belt 219, a flywheel 220, a capstan 42, a belt 221, a pulley 222, and a pinion 223 meshing with teeth 224 on the cam wheel 211. The pinion 223 is coaxial with the pulley 222 and is mounted on one end of a lever 225 which is pivoted at 226. The pinion 223 is disengaged from the cam wheel by rotating the lever 225 clockwise. A spring 229 is stretched between the lever 225 and an actuator 228 of an electromagnetic plunger 227. When a pulse of current is supplied to the plunger 227, the lever 225 is rotated counterclockwise against the bias of a spring 230. This causes the pinion to mesh with the teeth 224 to initiate rotation of the cam wheel 211. At this moment, the one end of the lever 225 is engaged by a bent portion 233 integrally formed in a leaf spring 232 which is pivoted on a pin 231. With this arrangement, after the plunger 227 is deenergized, the lever 225 is held in its position against the bias of the spring 230 so that the cam wheel 211 keeps rotating. When the cam wheel 211 has turned on its axis through an angle of nearly 360°, a boss 234 thereon engages a leaf spring 235 having a weight 236 at the one end thereof and pivoted at the other end on a pin 237 on the cabinet. As the cam wheel 211 is rotated further, the leaf spring 235 is bent by the boss 234 within the limit of its elasticity. When the leaf bending pressure ends as the boss 234 is disengaged from the leaf spring 235, it is restored to its normal shape. The returning force inherent in the spring 235 causes the weight 236 to hit the one end of the leaf spring 232 moving the bent portion 233 out of engagement with lever 225 so that the lever is urged clockwise to its normal position. At the same time, the pinion 223 is disengaged from teeth 224 and rotation of the cam wheel 211 stops. A pin 238 is provided for arresting clockwise rotation of the lever 225.

FIG. 21 shows the relationship of boss 234 and leaf spring 235. As the cam wheel 211 advances in the direction of arrow P, the boss 234 pushes the bends of the leaf spring 235. The instant the boss 234 passes the edge $235_1$ of the notch in spring 235 as the wheel 211 advances, the spring 235 returns to its normal shape and the weight 236 hits the end of the spring 235 to move the bent portion 233 away from the lever 225. This arrangement has the advantages in that engagement and disengagement of the bent portion with the linkage can be positively carried out and the possibility of malfunctioning of the apparatus is reduced due to the fact that switch means is not used.

Figure 22A:
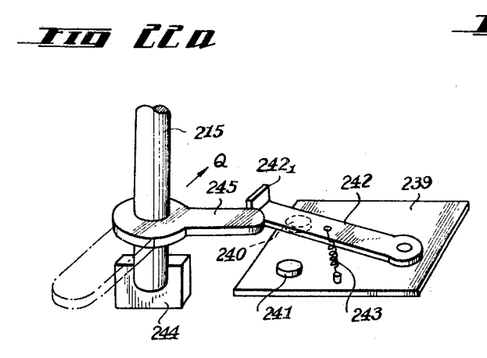
FIGS. 22a and 22b are perspective views of a track selecting mechanism.
Figure 22B:
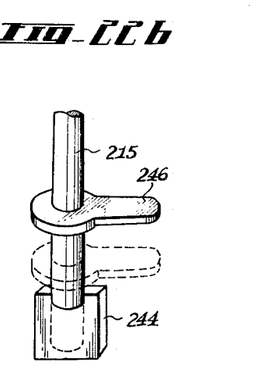

A modified form of the mechanism for selecting one of a plurality of magnetic heads to play a selected track is illustrated in FIGS. 22a, 22b and 23. A switch lever 242, see FIG. 22a, engages either of the two contacts 240 and 241 mounted on a base 239, but normally engages the contact 241 under influence of a spring 243. When the casing 190 is rotated, the push button link 215 is moved in the direction of arrow Q to engage the raised portion 244 provided on the cabinet to thereby arrest rotation of the casing. At this point, the switch lever 242 is urged in the direction of the contact 240 by a hook lever 245 on the link 215, thus contacting the switch lever 242 with the contact 240 which allows the one head engaging the one track to feed a signal to the amplifier. In order to cause the other head engaging the other track to reproduce, the link 215 can be turned around its axis through an angle of 90° to the position shown by the dotted lines of FIG. 22a so that the switch lever 242 will engage with the contact 241, being bypassed by the hook lever 245.

The push button link 215, as shown in FIG. 22b, is adapted to allow the hook lever 246 to engage the switch 242 where the push button is depressed to a second depressed position beyond that necessary to arrest rotation of the casing, and hence to play the second of two tracks on the tape. As seen from the drawing, with the initial depression, the hook lever 246 is moved to the position shown gy the solid lines, that is, it does not engage the switch lever 242, but passes above it. The hook lever 246 is moved into the position shown by the dotted lines when it is moved to the second depressed position to contact switch lever 242 to change over the switch to energize the head for the other track. With a stereo head it is necessary to change over two channels so that the number of contacts of the change over switch are twice what they are in this arrangement. The same principle is, however, applicable to the stereo head. Any other appropriate conventional switch lever and contacts may be employed in this arrangement.

Where the head is to be moved relative to the tape, the head 37 is carried by a support plate 147 formed out of elastic material and is normally urged in the direction of arrow R. Full return of the support plate 247 to its undeformed position is prevented by rotating lever 248 which is pivoted on a pivot 249.

The angle between the rotating lever 248 and the support plate 247 is limited to a certain degree by a wall member 250 provided with a slot through which the lever 248 extends. The hook lever 245 carried by the push button link 215 when it is in the position shown by the dotted lines engages the free end of rotating lever 248 to cause it to be rotated so that the head 37 is moved from a position opposite one track to a position opposite the other.

Movement of the reciprocating lever 207 to bring the cartridge into the stand-by position causes the arm 210 to push the push button link 215 away from its engagement with the raised portion 244, and at the same time engagement of the hook lever 245 with the rotating lever 240 is released, allowing the link 215 to be moved in the direction of arrow T with further rotation of the casing.

Figure 24A:
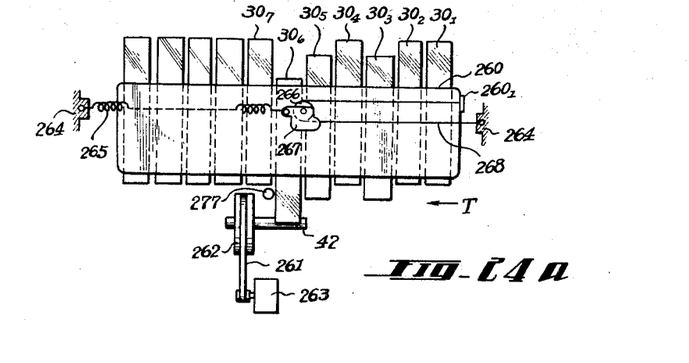
FIG. 24a is a plan view of a further embodiment of the present invention having a casing of rectangular shape.
Figure 24B:
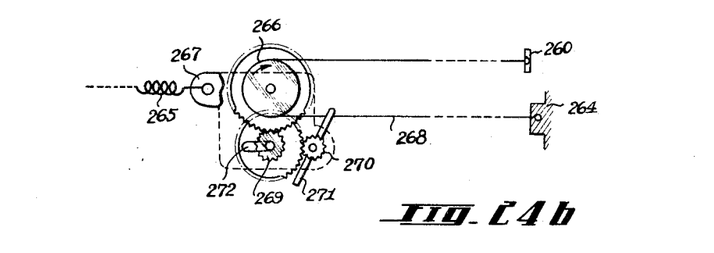
FIG. 24b is a schematic view of the driving mechanism therefor.

Referring to FIGS. 24a and 24b, a rectangular casing has a plurality of recesses into which are rectilinearly inserted a plurality of cartridges each of which is reciprocable in the casing between a stand-by and a play position in the manner previously described.

When an electric motor 263 starts rotating, a belt 261 and a flywheel 262 are rotated, and the capstan 42 starts rotating. The casing 260 is adapted to be transversely reciprocable by a reciprocating lever (not shown) similar to that of FIG. 7.

Mounted on the cabinet is a detent 277 which prevents the adjacent cartridge from coming out of the casing and arrests movement of the casing against further advancement to bring the selected cartridge into the stand-by position. A spring 265, see FIG. 24a, is stretched between a portion of the cabinet 264 and a support frame 267, which in turn has a pulley 266 thereon. A string 268, one end of which is attached to the one end of the casing, extends over the pulley 266 and terminates at the cabinet 264. The casing can thus be transversely reciprocable by the arrangement comprising the spring 265, the pulley 266, and the string 268 which are adapted to cooperate with each other.

The pulley 266, see FIG. 24b, has teeth thereon meshing with a pinion 269 to rotate it, and the teeth of the pinion mesh with the teeth 270 of a pulley to initiate rotation of a driven gear 271. The pinion 269 is mounted on a floating pivot which is slidable in a slot 272 formed in the support frame 267. Clockwise rotation of the pulley 266 releases the pinion 269 from the teeth 270 of the pulley, because the floating pivot is moved leftwardly. When the pulley 266 is rotated counterclockwise, engagement of the pinion 269 with the teeth 270 is established, and the pulley of gear 271 acts as a governor means. If the casing is moved to the right, such movement is easily carried out because the pinion 269 is disengaged from the teeth 270. Once movement of the casing is stopped, the spring 265 urges the pulley 266 leftwards and the casing is moved at a fixed speed.

The spring 265 must be able to expand half the casing travelling distance because the length thereof will be greatly shortened. Thus, the apparatus will have a compact structure. Several pulleys may be employed for facilitating movement of the casing.

Figure 25:
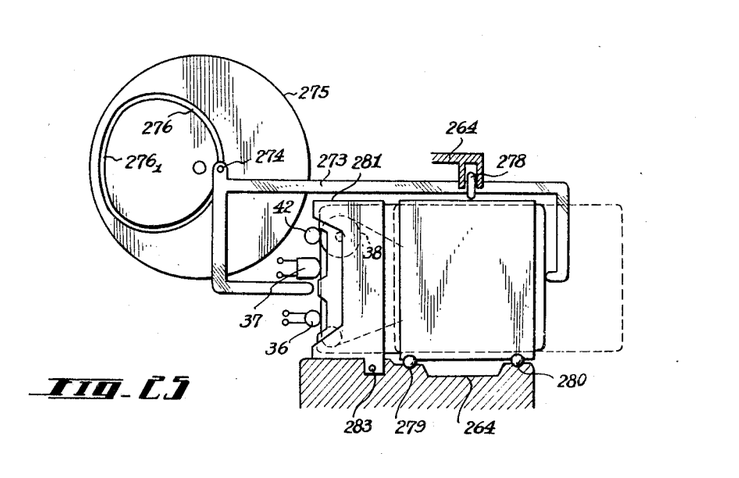

A further modification of the cartridge operating mechanism is shown in FIG. 25. This mechanism is substantially the same as those illustrated in FIG. 3 and 19.

A reciprocating lever 273 is moved in the direction of its length by a circular motion of a pin 274 which is engaged in a groove 276 in a cam wheel 276. As previously set forth, the cam wheel 275 starts its rotation when the end mark on the tape is detected by the detector 36 by means and turns on its axis through an angle of 180° to move the cartridge from the play position to the stand-by position. At this moment, the crank pin 274 slides along the substantially rectilinear portion of the groove $267_1$ even though the cam wheel 275 keeps rotating so that movement of the lever 273 is substantially suspended. Assuming that the cartridge $30_6$ is brought from the play position into the stand-by position, the cartridge $30_6$ is disengaged from the detent 277 (FIG. 24a) and the casing starts its movement under influence of the spring 265, until the next selected cartridge $30_5$ engages the detent 277. Movement of the reciprocating lever 273 is substantially suspended for the period until the cartridge $30_5$ is engaged by the detent 277 to arrest movement of the casing. Subsequently, as the cam wheel 275 keeps rotating, the lever 273 is moved leftwards to bring the cartridge $30_5$ into the play position. In this maner, te cam wheel turns on its axis through an angle of 360° and rotation thereof can be terminated by switch means or mechanical means, as shown in FIGS. 3 and 20.

The cam wheel 275 thus retracts the reciprocating lever 273 in response to the detecting of the end mark signal and suspends movement of the lever for a certain period after the cartridge is moved to the stand-by position and then advances the lever 273 to bring the next selected cartridge into the play position at which time rotation of the cam wheel is suspended.

As seen from the foregoing, if the cartridges which are desired to be played are moved slightly out of the casing, the successive cartridges are readily played.

In order to allow the rectangular casing 260 to slide back and forth smoothly, as in FIG. 25, it is necessary to provide a roller 278 and a pair of steel balls 279 and 280. The roller 278 is carried by an attachment to the cabinet 264 and the pair of the balls 279 and 280 is mounted on the wall of the casing. A guide 281, shown in detail in FIG. 26, is secured to the cabinet 264 to receive the one end of the cartridge when it is moved into the play position, and which also serves as the detent 277 shown in FIG. 24.

When the cartridge is received by the guide 281 and the one end thereof engages portions indicated at 284 and 285, the cartridge is retained in position to secure engagement of the tape with the capstan 42, the head 37, and detector means 36 in their proper position. The cartridges desired to be played are successively inserted into the guide 281 by first being moved in the casing in the direction of arrow V into abutment with portion 286 and then into the guide by movement of the lever 287 in the direction of arrow U.

Figures 26, 27, 28, 29B:
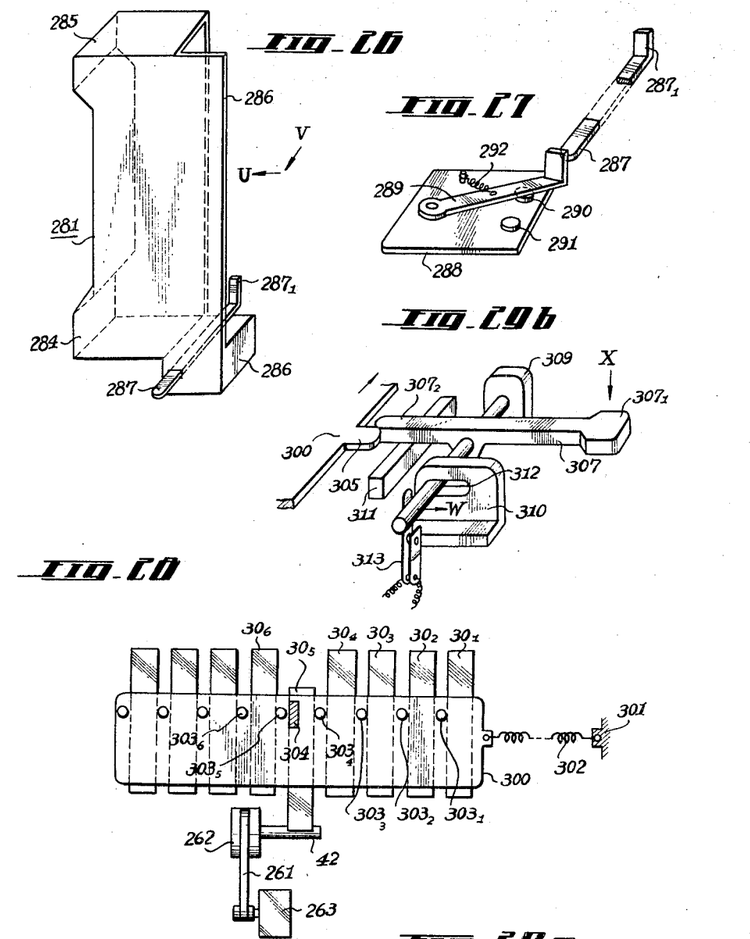
FIG. 26 is a perspective view of a guide to arrest movement of the cartridge allowing the cartridge to be in the proper position relative to the capstan and the magnetic head.
FIG. 27 is a perspective view of a magnetic head transferring mechanism.
FIG. 28 is a plan view of still a further embodiment of the present invention showing a modified form of the rectangular casing of the cartridge.
FIGS. 29a and 29b are plan and perspective views, respectively, of the engaging member for the casing of FIG. 28.

Bored through the corner 282 of the guide 281 is an aperture 283 through which a slider 287 slidably extends and which has the one end $287_1$ thereof in a position to engage the cartridge moving in the direction of arrow V and the other end in a position to engage a switch lever 289 shown in FIG. 27 for changing over the switch. In this manner, the operations involved in moving the cartridge into the play position and selecting the track are performed by two means, namely, engagement of the cartridge with the portion 286 of the guide 281, and movement of the slider 287.

The change over switch associated with the slider 287 for changing the head which is to reproduce is shown in FIG. 27 and comprises an insulator 288 having contacts 290 and 291, and a switch lever 289 which is normally urged by a spring 292 in the direction of the contact 290. When one track is required to be played, the cartridge is only moved a short distance out of the casing and the switch lever 289 is left in contact with contact 90 and the slider 287 is not engaged with the switch lever 289. When the other track is to be played, the cartridge is moved further out of the casing and engages the slider so that the slider 287 engages the switch lever 289 to connect it to the contact 291. The slider 287 can be omitted if the switch is positioned so that the lever 289 is directly engaged by the one end of the cartridge. For the convenience of the user, a suitable scale can be engraved on the casing 260 to indicate the two degrees of movement of the cartridge.

A cam driving mechanism such as those shown in FIG. 3 and FIG. 20 can be used in connection with the rectangular casing of FIGS. 24a and 24b.

Figure 29A:
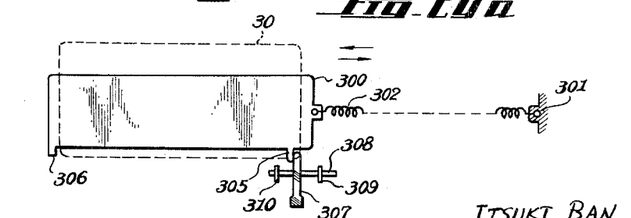

Still another modified form of the rectangular casing is shown in FIG 28 and FIGS. 29a and 29b. A plurality of cartridges 30 are removably inserted in casing 300, which is urged to the right by the bias of spring 302 stretched between the one end of the casing and the cabinet. Leftward movement of the casing causes the spring 302 to store energy therein. A plurality of push buttons 303 are arranged on the casing, one for each cartridge.

As shown in FIG. 28, the cartridge 30 is brought into the play position when movement of the casing is arrested by engagement of a depressed push button 303 by a detent 304. It should be noted that the cartridge in this modified form is operated by a mechanism like that shown in FIG. 19. When the last cartridge is returned to the standby position after the preceding cartridges have been played, means must be provided to arrest movement of the casing so that the casing is caused to be moved to the right to the proper position. Although movement of the casing to the right is completed, the reciprocating lever continues reciprocating. This interferes with the return movement of the casing to the left to start the next operation.

This problem is solved by the use of an engaging member as shown in FIGS. 29a and 29b.

An engaging member 307 has a tip portion $307_2$ at one end engaged with either one of the projections 305 or 306 integrally formed on the casing, and also has an end portion $307_1$ at the other end. The member 307 is pivotally mounted on a rod 308 which is rigidly attached at one end to a support 309 and passes through an elongated orifice 312 in a support 310 at the other end. A guide bar 311 is provided to carry the member 307 thereon and over which it is slidable. A contact 313 is provided which comprises a long and a short piece, respectively, and the former normally bears against the rod 308 which is slidable within the orifice 312 in a direction of arrow W to close the contact. The contact 313 is connected to the power mains for the cam driving mechanism of FIG. 20 to rotate the motor for the reciprocating member. In order to complete leftward movement of the casing to a critical position, the end portion $307_2$ must be moved away from the path of movement of the projections 305 and 306. When the casing is no longer arrested and the end portion $307_1$ is not depressed, the tip portion $307_2$ is engaged by the projection 305, as shown in FIG. 29a. Meanwhile, the spring 302 urges the casing to the right to cause the projection 305 to push the tip portion $307_2$ so that the rod 308 is rotated in a direction opposite to that of arrow W to push the long piece of contact 313 away from the short piece whereby the contact 313 is opened. This stops operation of the apparatus to provide time to depress the push buttons for selecting the cartridges in accordance with the next program. Thereafter, when the end portion $307_1$ is depressed to release the tip portion $307_2$ from engagement with the projection 305, movement of the casing is initiated for bringing the selected cartridges desired to be played to the proper position and the contact 313 is closed to start operation of the apparatus. When all the selected tapes have been played, rightward movement of the casing is continued until the tip portion $307_2$ is engaged by the projection 306 to cause the contact 313 to be opened. As a result, reciprocable movement of the reciprocating lever is terminated to stop operation of the apparatus without any interference with the movement of the casing by the reciprocating lever. The member 307 can be reciprocable for establishing engagement of the tip portion $307_2$ with the projections 305 and 306.

An advantage derived from the use of the engaging member is also obtained by application of the same to the apparatus in which the annular casing radially storing the cartridges is used.

From the above description, it is apparent that the present invention provides not only an effective apparatus utilizing a plurality of cartridges which are successively played in accordance with a sequential program, but also a simple construction by which automatic operation is effected without consumption of much current.

The illustrative embodiment described above and shown in the drawings is obviously susceptible of modification in the form and detail within the spirit of the invention. For example, the push button link may be incorporated within the cartridge, as the case may be. Other modifications will be apparent to those skilled in the art.

What is claimed is:

1. An apparatus for automatically playing a plurality of endless tape cartridges in succession according to a specific sequential program, comprising a casing for holding a line of a plurality of cartridges for slidable movement transversely of the casing, mounting means on which said casing is movably mounted for movement in the direction of the line of cartridges for moving the cartridges in succession past a reproducing station, a plurality of pushbutton means, one for each cartridge, slidably mounted on said casing for movement in the direction of sliding movement of the cartridges, an abutment at said reproducing station with which the depressed pushbutton means are engageable for stopping movement of said casing, a cartridge moving lever at said reproducing station reciprocally movable in the direction of the sliding movement of said cartridges and engageable with successive cartridges at said reproducing station for moving the cartridge from the casing into a play position and back into the casing, a lever moving means coupled to said lever for moving said lever in one direction at the time when the casing brings the cartridge into position opposite the reproducing station and moving it in the other direction when the play of the tape is ended, said lever being engageable with said pushbutton link to release said latch means, a drive connecting means coupling said lever moving means with the drive of the tape recorder and reproducer for actuating the lever moving means to move the cartridge being played into the casing and after the casing has moved, moving the next cartridge in succession into the reproducing station and then disconnecting the lever moving means from the drive, and a sensing device for scanning the tape for sensing completion of play of the tape, said sensing device being coupled to said drive connecting means for actuating it when play of the tape has ended.

2. An apparatus as claimed in claim 1 further comprising latch means on said pushbutton means and said cartridge for holding the pushbutton means in position.

3. An apparatus as claimed in claim 1 further comprising magnetic head moving means at said reproducing station adapted to be coupled to the magnetic reproducing head of the reproducing apparatus for moving the tape head between tracks on a tape, and track indexing means on said cartridges engageable with said magnetic head moving means when said cartridge is at the reproducing station for indexing the magnetic head for playing at least one of the plurality of tracks on the tape in the cartridge.

4. An apparatus as claimed in claim 3 further comprising means coupled to said magnetic head moving means and said track indexing means for actuating the track indexing means for moving the magnetic head moving means for successively moving the magnetic head to play all of the tracks on the tape in succession.

5. An apparatus as claimed in claim 1 in which there are a plurality of magnetic heads at the reproducing station, one for each track on said tapes in the cartridges, and said apparatus further comprising switching means coupled to said heads for switching from one head to another depending on the track which it is desired to reproduce, and track indexing means on said cartridges engageable with said switching means when said cartridge is at the reproducing station for switching the switching means to play at least one of the plurality of tracks on the tape in the cartridge.

6. An apparatus as claimed in claim 5 further comprising means coupled to said switching means and track indexing means for actuating the track indexing means for moving the switching means to successively switching to all of the heads to play all of the tracks on the tape in succession.

7. An apparatus as claimed in claim 1 in which said casing is a cylindrical casing with the cartridges arranged radially therein and are movable parallel to the cylindrical axis of the casing, and means are coupled thereto for driving the casing about its cylindrical axis for moving the cartridges along a circular line.

8. An apparatus as claimed in claim 7 in which said casing is an elongated rectangular casing with the cartridges arranged side by side and movable laterally, and means are coupled thereto for driving said casing in the direction of its length to move the cartridges along a line in the direction of the length of the casing.

9. An apparatus for automatically playing a plurality of endless tape cartridges in succession according to a specific program, comprising a casing for holding a line of a pluraltiy of cartridges for slidable movement transversely of the casing, mounting means on which said casing is movably mounted for movement in the direction of the line of cartridges for moving the cartridges in succession past a reproducing station, said cartridges being partially movable out of said casing to a projecting position, an abutment at said reproducing station with which the cartridges in the projecting position are engageable for stopping movement of said casing, a cartridge moving lever at said reproducing station reciprocally movable in the direction of the sliding movement of said cartridges and engageable with successive cartridges at said reproducing station for moving the cartridge from the projecting position into a play position and back into the casing, a lever moving means coupled to said lever for moving said lever in one direction at the time when the casing brings the cartridge into position opposite the reproducing station and moving it in the other direction when the play of the tape is ended, a drive connecting means coupling said lever moving means with the drive of the tape recorder and reproducer for actuating the lever moving means to move the cartridge being played into the casing and after the casing has moved, moving the next cartridge in succession into the reproducing station and then disconnecting the lever moving means from the drive, and a sensing device for scanning the tape for sensing completion of play of the tape, said sensing device being coupled to said drive connecting means for actuating it when play of the tape has ended.

10. An apparatus as claimed in claim 9 further comprising magnetic head moving means at said reproducing station adapted to be coupled to the magnetic reproducing head of the reproducing apparatus for moving the tape head between tracks on a tape, and track indexing means on said cartridges engageable with said magnetic head moving means when said cartridge is at the reproducing station for indexing the magnetic head for playing at least one of the plurality of tracks on the tape in the cartridge.

11. An apparatus as claimed in claim 10 further comprising means coupled to said magnetic head moving means and said track indexing means for actuating the track indexing means for moving the magnetic head moving means for successively moving the magnetic head to play all of the tracks on the tape in succession.

12. An apparatus as claimed in claim 9 in which there are a plurality of magnetic heads at the reproducing station, one for each track on said tapes in the cartridges, and said apparatus further comprising switching means coupled to said heads for switching from one head to another depending on the track which it is desired to reproduce, and track indexing means on said cartridges engageable with said switching means when said cartridge is at the reproducing station for switching the switching means to play at least one of the plurality of tracks on the tape in the cartridge.

13. An apparatus as claimed in claim 12 further comprising means coupled to said switching means and track indexing means for actuating the track indexing means for moving the switching means to successively switching to all of the heads to play all of the tracks on the tape in succession.

14. An apparatus as claimed in claim 9 in which said casing is a cylindrical casing with the cartridges arranged radially therein and are movable parallel to the cylindrical axis of the casing, and means are coupled thereto for driving the casing about its cylindrical axis for moving the cartridges along a circular line.

15. An apparatus as claimed in claim 9 in which said casing is an elongated rectangular casing with the cartridges arranged side by side and movable laterally, and means are coupled thereto for driving said casing in the direction of its length to move the cartridges along a line in the direction of the length of the casing.

References Cited

UNITED STATES PATENTS

| | | | |
|---|---|---|---|
| 3,381,910 | 5/1968 | Fundingsland | 242—55.13 |
| 3,326,483 | 6/1967 | Ivans | 242—55.13 |
| 3,317,212 | 5/1967 | Tatter et al. | 242—55.13 |
| 3,289,962 | 12/1966 | Gellenthin | 242—55.13 |
| 3,188,091 | 6/1965 | Goodell | 274—11 |
| 3,127,178 | 3/1964 | Osborne et al. | 274—4 |
| 3,083,269 | 3/1963 | Gaubert | 179—100.2 |
| 3,009,024 | 11/1961 | Gash | 179—100.2 |

HARRY N. HAROIAN, Primary Examiner